United States Patent [19]

Härtel

[11] 4,354,383
[45] Oct. 19, 1982

[54] METHOD OF AND DEVICE FOR MEASURING THE AMOUNT OF LIQUID FUEL IN A TANK

[75] Inventor: Günter Härtel, Neuss, Fed. Rep. of Germany

[73] Assignee: Bosch & Pierburg System oHG, Neuss, Fed. Rep. of Germany

[21] Appl. No.: 181,679

[22] Filed: Aug. 27, 1980

[30] Foreign Application Priority Data

Sep. 20, 1979 [DE] Fed. Rep. of Germany ....... 2937966

[51] Int. Cl.³ .............................................. G01F 23/14
[52] U.S. Cl. ..................................... 73/290 B; 73/302
[58] Field of Search ................. 73/290 R, 290 B, 302, 73/303, 149

[56] References Cited

U.S. PATENT DOCUMENTS

| 1,945,203 | 1/1934 | Schiske | 73/290 B |
| 3,744,306 | 7/1973 | Krueger | 73/149 |

FOREIGN PATENT DOCUMENTS

| 541274 | 1/1932 | Fed. Rep. of Germany. |
| 897331 | 11/1953 | Fed. Rep. of Germany. |
| 2737069 | 1/1979 | Fed. Rep. of Germany. |
| 819201 | 10/1937 | France. |
| 54116 | 2/1967 | German Democratic Rep. ... 73/290 R |
| 224450 | 2/1943 | Switzerland. |
| 509258 | 7/1939 | United Kingdom ................... 73/302 |

Primary Examiner—Anthony V. Ciarlante
Assistant Examiner—Joseph W. Roskos
Attorney, Agent, or Firm—Toren, McGeady & Stanger

[57] ABSTRACT

To measure the amount of liquid fuel in a ventilated fuel tank (1), the ventilation of the tank is stopped temporarily by a valve (7) and gas is removed from or fed into the unventilated tank through a device (12). A quantity indicative of the change in the gas state in the tank is measured after feeding in or removal of the gas to provide an indirect measurement of the amount of fuel in the tank. The gas may be removed from or fed into the tank at a constant volumetric flow rate, in which case the quantity measured will be the time taken for a predetermined alteration in the pressure of gas in the tank to occur. Alternatively, gas may be removed until a predetermined reduced pressure in the space in the tank is reached and the volume of gas removed can provide a direct or indirect measure of the amount of fuel in the tank. As a second alternative a predetermined volume of gas is removed and the alteration in pressure of the gas in the tank is measured.

20 Claims, 4 Drawing Figures

METHOD OF AND DEVICE FOR MEASURING THE AMOUNT OF LIQUID FUEL IN A TANK

The invention relates to a method of and a device for measurement of the amount of liquid fuel in a ventilated fuel tank.

Known fuel gauges for motor vehicles usually measure by means of a float and are relatively inaccurate. This applies particularly to modern fuel tanks which, for better utilization of space in the vehicle, are built with recesses and are configured to the available space in each case. Measurement by float is position dependent and therefore the float is strongly damped, which leads to a sluggish response. Theoretically, it would also be possible to determine the state of fill and/or consumption by using flow measurement. However, flowmeters are technically elaborate and hence too expensive. Furthermore, various problems arise with them, for example, as regards the development of vapour locks, amount of return fuel and discontinuous volumetric flow, so that flow measurement is not suitable.

An object of the present invention is to design a method and a device of the above kind, to avoid the disadvantages described and in such a way that a desirably accurate measurement of the amount of fuel in a fuel tank of any shape can be carried out relatively simply.

According to the present invention a method of measuring the amount of liquid fuel in a ventilated fuel tank comprises the steps of stopping temporarily the ventilation from the tank, removing from or feeding into the unventilated tank a given amount of gas, and measuring a quantity indicative of the change in the gas state in the tank to provide an indirect measurement of the amount of fuel in the tank. Hence the result of measurement in contrast to measurement with the assistance of a float is independent of the structural shape of the fuel tank. The measurement is also uninfluenced by the position of the fuel tank at the time, since the whole of the volume of gas above the fuel is always included in the measurement. Damping of the measuring procedure is not necessary, so that accurate measurements are possible even if the surface of the fuel is uneven through vibration. The method can be performed simply and cheaply and is largely insusceptible to disturbance.

In a first embodiment of such a method the gas is sucked out or fed in at a constant volumetric flow per unit of time and the time until a predetermined reduced pressure in the space in the tank is reached is picked up as the measured variable. This is a particularly accurate method as the time measured is directly proportional to the volume of gas enclosed and hence indirectly proportional to the amount of fuel.

In a second embodiment the gas is sucked out until a predetermined reduced gas pressure in the tank is reached and the volume of gas sucked out is measured directly or indirectly as the measured variable. This method too leads to an accurate result of measurement.

In a third embodiment a predetermined volume of gas is sucked out and the alteration in pressure of the gas in the space in the tank is picked up as the measured variable. This method is a little simpler but, however, not quite so accurate as the first two methods. Furthermore there exists a nonlinear relationship between the alteration in gas pressure as the measured variable and the volume of gas in the fuel tank.

In all three embodiments in which the compressibility of the volume of gas enclosed in the space in the tank is utilized, it is theoretically possible for the measuring procedure to be carried out at at least two different times and the difference between the measured variable so obtained to be determined as a measure of the fuel consumption. Preferably, in this case, the measuring procedures are repeated at constant intervals of time or after constant kilometer distances covered. Furthermore the measured variables and/or their differences may be called upon for purposes of indication, recording and/or control. It is thereby possible in a simple way, for example, by the utilization of computers carried on the motor vehicles to provide for continuous indication of the fuel consumption per hour, per 100 km or over the distance travelled up to that time, or an indication of the further distance which it is possible to travel on the remaining contents of the tank. Because of the comparatively accurate determination of the amount of fuel in the tank these or other derived values can be calculated correspondingly accurately.

According to a second aspect of the invention a device of measuring the amount of liquid fuel in a fuel tank having a ventilation pipe comprises a ventilation valve located in the ventilation pipe; means for maintaining the valve in a normally open position but in a closed position in use, and being connected in use to the tank for the removal from or feeding into the tank of gas; and having a sensor coupled to the said means or to the tank for measuring a quantity indicative of the change in the gas state in the tank to provide an indirect measurement of the amount of fuel in the tank. Such a device is relatively simple as well as cheap and enables a comparatively accurate measurement of the state of fill of the tank. The device may be employed universally for all types of vehicle and independently of the mixture-generating apparatus used, of the working process of the engine in question as well as of the shape and volume of the tank and with or without fuel return piping.

A first device in accordance with the invention has preferably a differential pressure regulator between the space in the tank and a reduced pressure pipe or respectively an overpressure pipe, a suction pipe or respectively a pressure pipe connecting the input and output of the regulator and provided with a construction, a manometer for picking up a predetermined reduced pressure or respectively overpressure in the space in the tank and a sensor in the form of a timer for picking up the time elapsed until the predetermined reduced pressure or respectively overpressure is reached, as a measured variable indicative of the state of fill of the tank. Hence, it is possible with the aid of the differential pressure regulator continually to remove from or feed into the space in the tank gas at a constant volumetric flow per unit of time, since a constant differential pressure is maintained at the throttled suction pipe or pressure pipe respectively. The time taken to reach the prescribed reduced pressure or respectively overpressure in the space in the tank is directly proportional to the volume of gas enclosed in the space in the tank and hence indirectly proportional to the amount of fuel.

In a further refinement of this device a manometer in the form of a reduced pressure switch or respectively an overpressure switch, is used, having an electrical switch which is normally closed and is opened when the predetermined reduced pressure or overpressure respectively is reached, and an electromagnetic control valve is connected to the reduced pressure pipe or overpressure pipe respectively, electrical control connection being provided between a central control and the switch and between the switch and the control valve. Hence a quantitive determination of the reduced pressure or respectively overpressure in the space in the tank may be omitted, since in the case of the measuring procedure what is important is only to pick up the time until a prescribed value of reduced pressure or respectively overpressure is reached, which can be done by an appropriately set reduced pressure switch or overpressure switch. A constantly accurate response level of the pressure switch can be guaranteed relatively easily, since the device has only one operating point and this is always switched from the same direction of movement. The electrical control connections enable automatic interruption of the gas removal process or respectively the gas infed process after response of the pressure switch and hence a reliable measuring procedure.

Preferably, in addition, a movable control diaphragm is provided, in a differential pressure regulator, between a first chamber connected to the space in the tank and a second chamber, a compression spring in the second chamber or respectively in the first chamber in engagement with the diaphragm and a control port opening into the second chamber in the working area of the control diaphragm from the reduced pressure pipe or overpressure pipe respectively. Preferably, a control engagement exists between the control diaphragm and the ventilation valve and the latter is provided with a spring which closes the ventilation valve during the measuring procedure. The differential pressure regulator described is simply constructed and is particularly suitable for the present purpose. The control membrane which in combination with the control opening regulates the differential pressure in the suction pipe or pressure pipe respectively has, in the closed state of the control valve and hence in the out-of-use state of the differential pressure regulator, the additional function of opening the ventilation valve so that after the conclusion of the measuring procedure the tank is ventilated. This multiple utilization of the control diaphragm of the differential pressure regulator leads to a simpler and cheaper device and, because of a smaller number of driving elements, to one which is more reliable.

In connection with the performance of the second and third embodiments of the method in accordance with the invention the device preferably has a cylinder and a piston which is movable by reduced pressure out of a defined rest position and which define a first chamber which is connected to the space in the tank, as well as a second chamber which is connected during the measuring procedure via a control valve to the reduced pressure pipe and which is otherwise ventilated. A pushrod opens the ventilation valve against the action of a closing spring and extends into the first chamber, being deflected by the piston in its rest position. The removal of gas from the tank by means of a piston controlled by reduced pressure is particularly simple and cheap. Moreover a further simplification of the construction results from the fact that in its position of rest the piston is utilized to open the ventilation valve.

For carrying out the second embodiment of the method of the invention the device has in further refinement in the form of a reduced pressure regulator between the control valve and the second chamber, a length of stroke of the piston which is unrestricted in the measuring range, and a sensor in the form of an instrument for measurement of the length of stroke for picking-up the stroke of the piston at any time as the measured variable for the state of fill of the tank. In this case during the stroke of the piston there is essentially the same pressure in the first and second chambers of the cylinder. The stroke of the piston, which serves as the measure of the volume of gas has been removed, can be picked up in a very simple way to form the measured variable for the state of fill of the tank.

In comparison a device for the third method the invention has a fixed length of stroke of the piston and a sensor in the form of a reduced pressure meter connected to the space in the tank. By these means a constant volume of gas is always withdrawn from the gas space so that in dependence upon the volume of gas a higher or lower value of the reduced pressure occurs in the space in the tank. As compared with a defined removal of gas with the aid of a flowmeter, that with the aid of a piston has the essential advantage of a considerably simpler structural form.

Preferably, the piston is pot-shaped and is open to the second chamber and has a sealing membrane which connects the piston limply to the cylinder. The cylinder with the piston may be arranged approximately vertically, the piston being carried back by gravity into its rest position when out of use. But it is also possible to arrange in the second chamber a compression spring which prestresses the piston into its rest position. In this case a vertical arrangement of the cylinder with the piston is unnecessary.

Preferably, there is a pin on the piston which engages in a guide in the cylinder. By this means the piston is guided satisfactorily even when there is adequate clearance between the piston and cylinder for the limply connecting sealing membrane. Furthermore, in the device for the performance of the second embodiment of the method of the invention an electrical measuring coil may be associated with the guide, for sensing the stroke of the piston. This construction is particularly compact and simple.

The device preferably has a central control connected to the sensor, the control valve and an indicator. This control may advantageously be made as an electronic computer, preferably as a microprocessor. By that means all of the control and computing processes can be carried out rapidly, completely automatically and accurately in a reliable and cheap manner.

A particularly compact construction of the device results when its first chamber is connected to the ventilation pipe from the space in the tank. Firstly by this means it is easier to actuate the ventilation valve in the ventilation pipe by a component by the device which exists anyway, such as by the control diaphragm of the differential pressure regulator or by the piston serving for the removal of gas. Secondly the device can be made as an integrated unit which merely has to be connected to the ventilation pipe from the fuel tank. If necessary any other tappings from the fuel tank may then be eliminated, since the pick-up of the reduced pressure or overpressure respectively in the space in the tank also be effected indirectly in the region of the ventilation pipe or respectively of the first chamber of the differential pressure regulator or of the cylinder. Hence the device can be installed in motor vehicles in a very simple way and also as a later accessory.

Hence the method and the device in accordance with the present invention enable a rapid automatic and adequately accurate pick-up of the state of fill of the tank without impairment by the different constructions of fuel tank and the different service conditions. The device in accordance with the invention can be built-in simply and cheaply and also at a later date and can be employed universally and enables versatile adaptation of the results of measurements to the conditions of consumption in each case.

Four examples of devices according to the invention and their methods of operation will now be described with reference to the accompanying drawings, in which.

Figure 1:
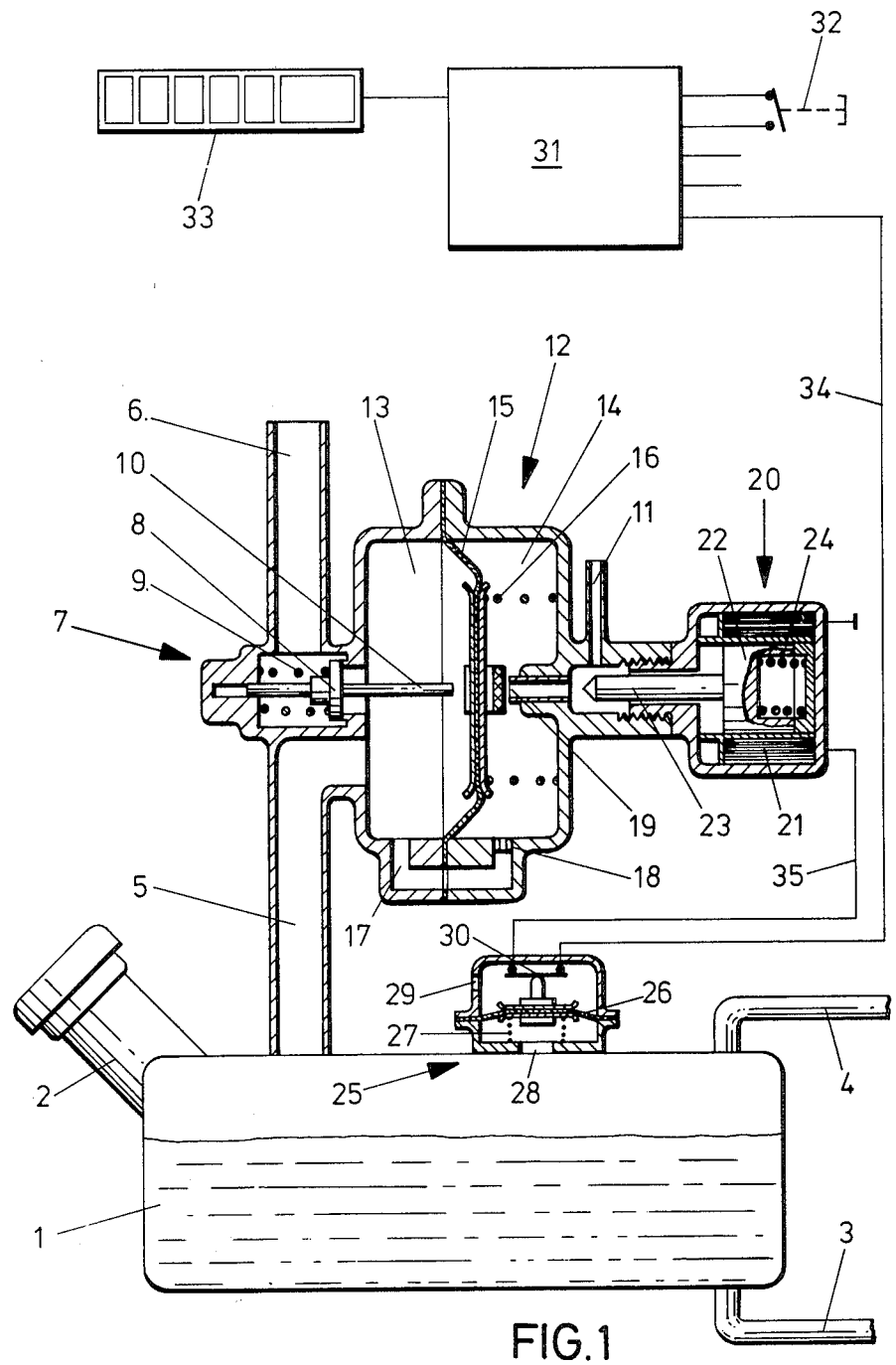
FIG. 1 is a diagrammatic view of a first example of a device constructed in accordance with the invention.

FIG. 1 shows a fuel tank 1 into which liquid fuel may be introduced via a filler cap 2. A feed pipe 3 leads from the bottom of the tank to, for example, the float chamber of a carburettor (not shown) to feed fuel to say a combustion engine. Excess fuel may be carried back via a return pipe 4 which opens into the tank 1 at the top. Finally the tank 1 has a ventilation pipe 5 leading off from its top, the pipe 5 being connected to a ventilation stub 6 leading to the atmosphere to enable ventilation of the tank 1.

Between the ventilation pipe 5 and the ventilation stub 6 there is disposed a ventilation valve 7 having a valve disc 8 and a closing spring 9 which prestresses it in the direction to close. The ventilation valve 7 can be opened by a pushrod 10 connected to the valve disc 8 against the action of the closing spring 9, as is explained in greater detail below.

A reduced pressure pipe 11 which at its other end is connected, for example, to the induction manifold of the engine, connects to a differential pressure regulator 12 having a first chamber 13 which is connected directly to the ventilation pipe 5 and, via the valve 7, to the stub 6. A second chamber 14 is separated from the first chamber 13 by a movable control diaphragm 15. In the second chamber 14 there is a compression spring 16 which biasses the control diaphragm 15 toward the first chamber 13. The first and second chambers 13, 14 are connected by a suction pipe 17 having a constriction 18. The reduced pressure pipe 11 opens into the chamber 14 through a control opening 19 which, in operation may be opened to a greater or lesser extent by the control diaphragm 15.

An electromagnetic control valve 20 is connected to the regulator 12 and has an electrically controllable magnet coil 21 with which is associated a linearly movable valve slider 22 having a shank 23. At the front end of the shank 23 is a valve cone which blocks the connection between the reduced pressure pipe 11 and the control opening 19 in the unexcited state of the coil 21 by means of a compression spring 24 which prestresses the valve slider 22 in the closing direction. In the excited state of the coil 21 of the control valve 20 is opened against the action of the compression spring 24.

A manometer 25, in the form of a reduced pressure switch, is attached to the tank 1 and has a diaphragm 26 which separates two chambers from one another. In one of the chambers there is a compression spring 27 and this chamber is connected via an opening 28 to the interior of the tank. The other chamber has a vent 29 and a switch 30 controlled by the diaphragm 26. A central control 31 in the form, for example, of a microprocessor is connected to a key 32 for actuation by hand and to a multiple, for example, digital indicator 33 for the display of the amount of fuel in the tank or the fuel consumption. From the central control 31 an electrical connection 34 leads to one contact of the switch 30, the other contact of which is connected via an electrical connection 35 to the coil 21, which is earthed at its other side.

Operation is as follows:

In the state of rest the control valve 20 is blocked and the compression spring 16 presses the control diaphragm 15 against the pushrod 10 to open the ventilation valve. In this state the switch 30 of the manometer 25, formed as a reduced pressure switch, is closed. Upon actuation of the key 32 or, alternatively, automatically in a repeating measuring cycle, the central control 31 generates a control signal which via the electrical connections 34 and 35 and the switch 30 opens the control valve 20. The device is thereby set in operation and a constant volume of gas flow per unit of time can be withdrawn through the pipe 11 until the reduced pressure switch 30 responds.

Upon the opening of the control valve 20 the reduced pressure from the reduced pressure pipe 11 acts on the control diaphragm 15 to move it against the action of the compression spring 16 and releasing the pushrod 10. The closing spring 9 thereupon moves against the valve disc 8 and hence closes the valve 7 to interrupt the ventilation path from the tank via the ventilation pipe 5, the first chamber 13 and the ventilation stub 6. When the control diaphragm 15, under the action of the reduced pressure, approaches the control opening 19 there follows a throttling of the gas being sucked in, in such a way that the force from the differential pressure against the control diaphragm 15 is exactly in balance with the force from the compression spring 16. Hence there is effected by the control diaphragm 15 a largely pulsation-free regulation of the differential pressure between the first and second chambers 13, 14. For satisfactory operation of the differential pressure regulator there must be a high ratio between the areas of the working face of the control diaphragm 15 and the control opening 19, so that overcontrol of the control diaphragm 15 on the one hand and reaction on the other are avoided. The actual operational movement of the control diaphragm 15 in the regulating state amounts only to some hundredths of a millimeter. Since in the suction pipe 17 and the constriction 18 there is a constant differential pressure prescribed by the differential pressure regulator 12, a constant volume of gas flow per unit of time is sucked into the chamber 14 via the constriction 18. The pressure in the tank 1 is thereby lowered and this process continues until the manometer 25 responds at an appropriate level of the reduced pressure and opens its switch 30. At this instant the excitation of the magnet coil 21 is interrupted so that the control valve 20 closes and the suction process is interrupted.

In the central control 31 there is a timer (not shown) which senses the closing and opening times of the control valve 20 to provide a measured variable time. If the volume of the first chamber 13 and the ventilation pipe 5 is neglected as compared with the volume of gas in the tank space 1, which is possible if the device is sufficiently small, the measured variable is directly proportional to the volume of gas in the tank space 1 and indirectly proportional to the amount of fuel in the tank. This measured variable may, for example, be displayed in digital form on the indicator 33. After completion of the measuring procedure the compression spring 16 sees to it that the control diaphragm 15 opens the ventilation valve 7 until a new measuring procedure is initiated. By comparing the measured variable at two measuring procedures effected at different times a second measured variable can be derived which corresponds with the fuel consumption in the interval.

Figure 2:
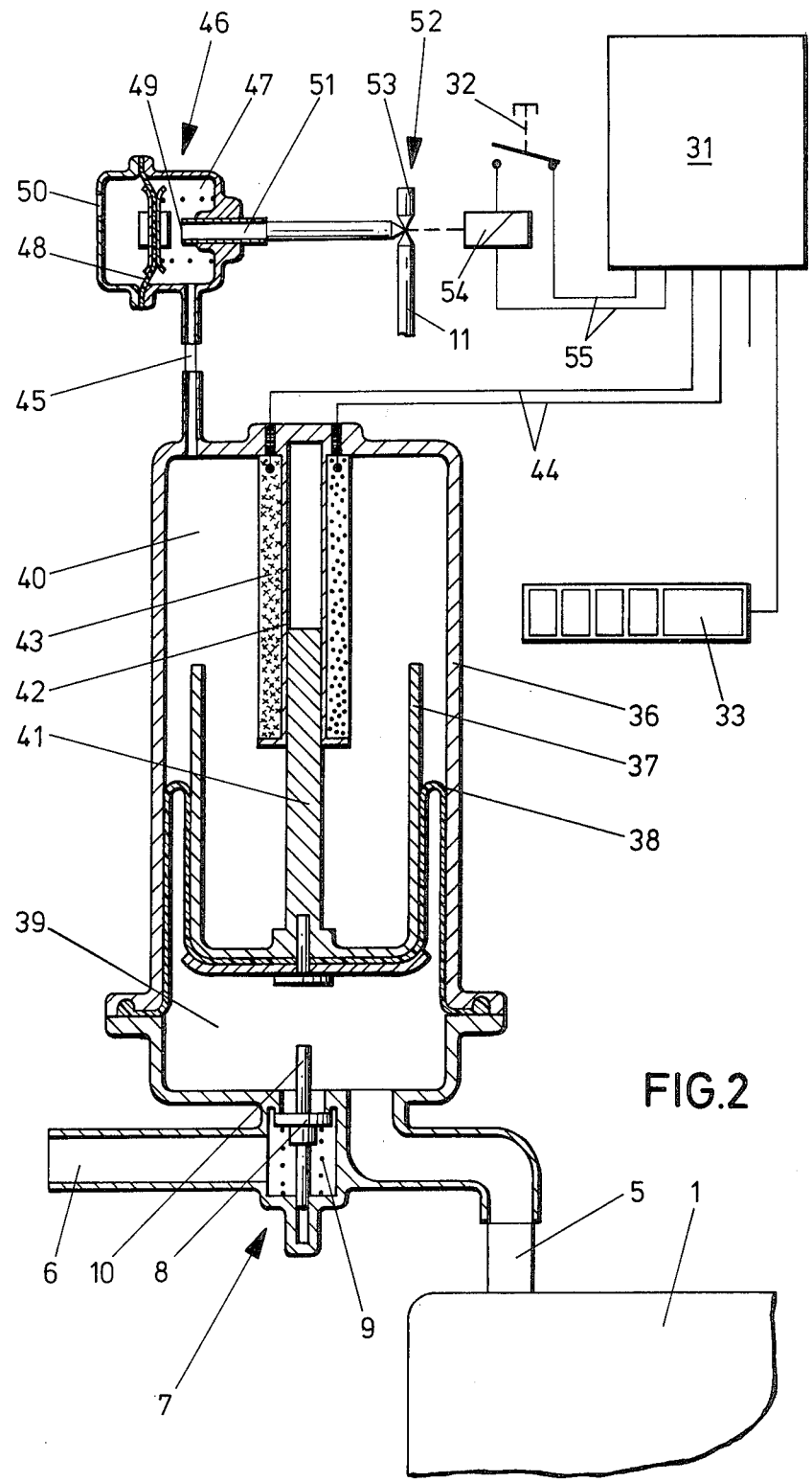
FIG. 2 is a diagrammatic view of a second example.

In the example shown in FIG. 2, parts corresponding with the first example are designated by the same reference numbers. A tank 1 is connected via a ventilation pipe 5 to a ventilation stub 6 leading to the atmosphere via a ventilation valve 7 having a valve disc 8 which is biassed by a spring 9 in the closing direction and having an opening pushrod 10.

A cylinder 36 has a linearly displaceable piston 37 which is arranged with a small clearance inside the cylinder and is sealed with respect to the cylinder 36 by a limp sealing membrane 38. The piston 37 is pot-shaped and, together with the sealing membrane 38 divides the cylinder into first chamber 39 which is connected to the ventilation pipe 5 and a second chamber 40 which is acted upon by reduced pressure, as will be described in greater detail below. Inside the pot-shaped piston 37 open to the second chamber 40 there is a central pin 41 which engages in a central guide 42 in the cylinder 36, to a greater or lesser depth depending upon the position of the piston. The guide 42 is surrounded by an electrical measuring coil 43 which is connected via an electrical connection 44 to a central control 31. The latter can, as in the case of the FIG. 1 example be a microprocessor or the like and be actuated by a key 32. The central control is connected to a digital indicator 33.

The second chamber 40 is connected via a pipe 45 to a reduced pressure regulator 46. This has a working chamber 47 which is bounded at one side by a control diaphragm 48 and in which lies a compression spring which acts upon the control diaphragm 48. A control opening 49 projects into the working area of the control diaphragm 48 and can be opened wider or less wide by the control diaphragm 48. At the side of the control diaphragm 48 opposite from the working chamber 47 lies a chamber having a vent 50. The control opening 49 is connected to a pipe connection 51 which is connected to one outlet from a control valve 52 in the form of a three way valve. One input to the control valve 52 is connected to a reduced pressure pipe 11 which is connected, for example, to the induction of the combustion engine, the other input 53 is a vent. The control valve 52 is connected to an electromagnetic drive 54 which is connected via an electrical connection 55 and, in the present case via the key 32, to the central control 31.

Operation is as follows:

When the device is out of use the second chamber 40 is ventilated via the pipe 45, the reduced pressure regulator 46 and the control valve 52. The piston 37 is thereby in its open position (moving thereto under its own weight until in its rest position), and by contact with the pushrod 10, it opens the ventilation valve 7 against the action of the closing spring 9. If necessary this movement in the direction towards the rest position may be assisted by a spring (not shown). In the rest position the pin 41 engages in the guide 42 and hence in the measuring coil 43 only to a comparatively small extent.

When the measuring procedure is initiated by actuation of the key 32 or by an automatically repeating cycle of the central control 3, a connection is effected from the reduced pressure pipe 11 to the reduced pressure regulator 46. The control diaphragm 48 is thereby pulled to a greater or lesser degree against the action of the compression spring towards the control opening 49, that is, in such a way that the reduced pressure in the working chamber 47 is kept constant. This reduced pressure comes acts via the pipe 45, on the piston 37 which moves upward under the influence of the reduced pressure, whereby the ventilation valve 7 is closed by means of the closing spring 9. Upon further upwards movement of the piston 37 gas is sucked out of the tank 1, whereby a gradually increasing reduced pressure arises in the tank. The piston 37 moves upwards until the forces on it are in equilibrium. In this state of equilibrium the reduced pressure in the tank corresponds with the reduced pressure in the reduced pressure regulator 46 or respectively in the second chamber 40 diminished by an amount which counterbalances the dead weight of the piston 37. After a short time of stabilization the piston position or respectively the piston stroke (starting from the rest position) may be ascertained, through the medium of the measuring coil 43, by the central control 31 as the measured variable for the amount of fuel in the tank. Subsequently the control valve 52 may be switched over by hand or automatically to the ventilation position, whereby the piston 37 comes back into its rest position under its own weight. In this example the individual measuring procedures may also be repeated at required points in time or at certain intervals of time, whereby the differences in the measured variables between two measuring procedures differing in time can also be utilized for measurement of fuel consumption.

Figure 3:
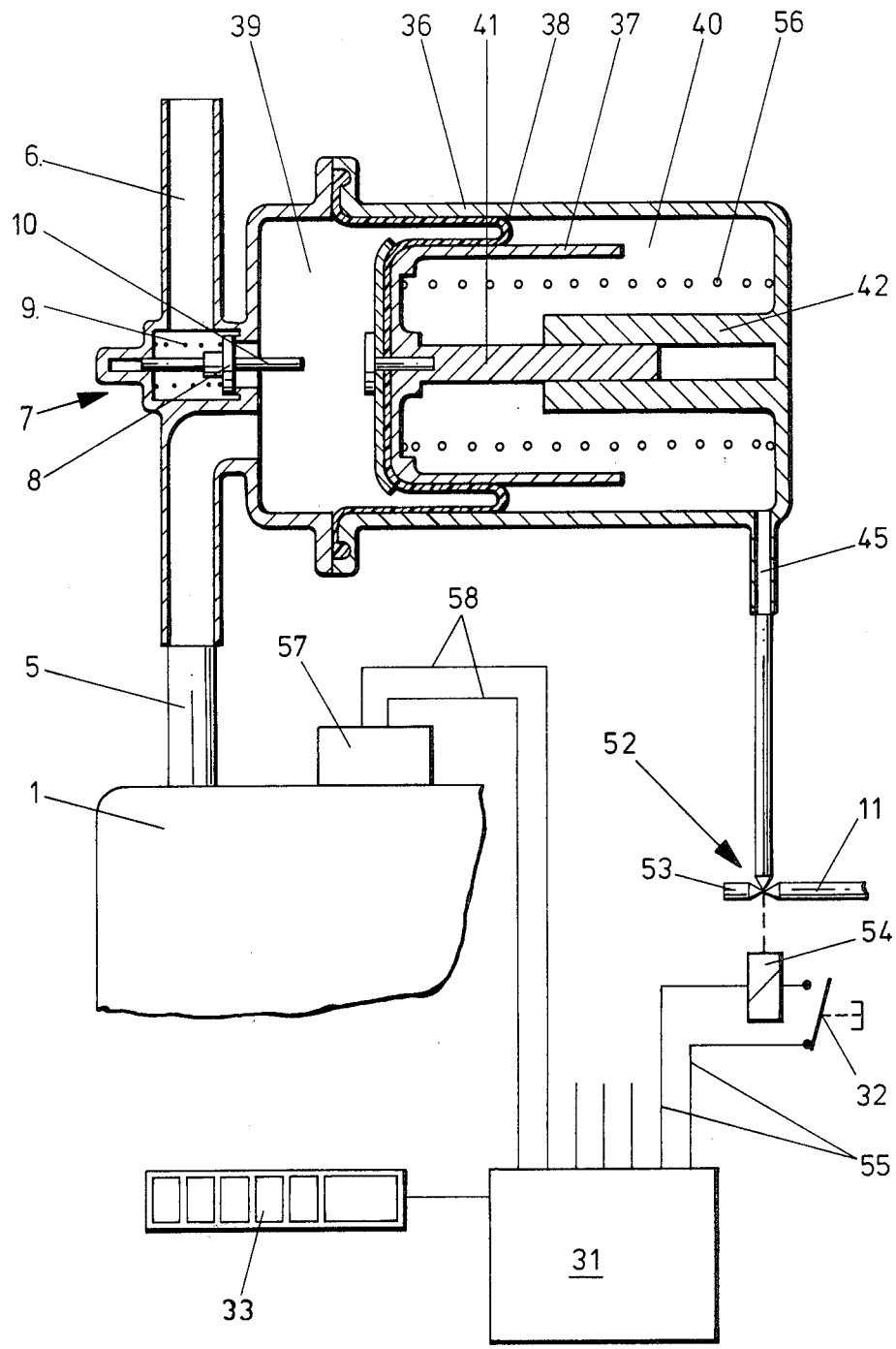
FIG. 3 is a diagrammatic view of a third example.

In FIG. 3 parts corresponding with the examples of FIGS. 1 and 2 are designated by the same reference numbers. A constant volume of gas is removed from a tank space 1 at each measuring procedure. The tank 1 is connected via a ventilation pipe 5 to a ventilation stub 6 leading to the outside, that is, via a ventilation valve 7 having a valve disc 8 which is biassed by a spring 9 in the closing direction. The ventilation valve 7 may be opened by displacement of a pushrod 10 against the action of the closing spring 9.

In a cylinder 36 there is a pot-shaped piston 37 which, in the present case, can be displaced horizontally, and which has a fairly large clearance in the cylinder 36 and is sealed with respect to the cylinder 36 by a limp sealing membrane 38. The piston 37 and the sealing membrane 38 separate a first chamber 39 which is connected to the ventilation pipe 5, from a second chamber 40 which is acted upon by reduced pressure as will be described below. The piston 37, open to the second chamber 40, has inside it a central pin 41 which engages in a central guide 42 in the cylinder 46 to a greater or lesser extent, depending upon the position of the piston. A compression spring 56 surrounding the guide 42 and the pin 41 in the second chamber 40 forces the piston 37 in the direction towards its rest position in which the piston 37 by contact with the pushrod 10 opens the ventilation valve 7.

A pipe 45 connects the second chamber 40 of the cylinder 36 to the output from a control valve 52 in the form of a threeway valve. One input to the control valve 52 is connected to a reduced pressure pipe 11 which is connected, for example, to the induction manifold of a combustion engine. The other input to the control valve 52 is a vent 53. The control valve 52 has an electromagnetic drive 54 which is coupled via an electrical connection 55 to a central control 31 which may again be in the form of a microprocessor, and is connected to a key 32 which is to be actuated by hand and for example, to a digital indicator 33. A sensor 57 in the form of a reduced pressure meter connected to the tank 1 is coupled via an electrical connection 58 to the central control 31.

Operation is as follows:

In the rest state the second chamber 40 of the cylinder 36 is ventilated via the control valve 52. Consequently the compression spring 56 can displace the piston 37 into its rest position whereby the ventilation valve 7 is opened. A ventilation path thereby exists from the tank 1 via the ventilation pipe 5, the first chamber 39 and the opened ventilation valve 7 to the ventilation stub 6. When the measuring procedure is initiated by actuation of the key 32 or because of a repeating internal cycle of the central control 3, switching-over of the control valve 52 onto the reduced pressure pipe 11 is effected. Under the influence of the reduced pressure arising in the second chamber 40 the piston 37 moves towards the right against the action of the compression spring 56 until it stops with its outer edge against the end of the cylinder 36. Upon the initial movement of the piston 37 the opening pushrod 10 is first of all released, whereby the ventilation valve 7 closes. Subsequently, at each measuring procedure an essentially constant volume of gas is withdrawn from the tank space 1, which leads to the pressure in the tank 1, depending upon the residual volume of gas, dropping more or less sharply. The reduced pressure which arises at the end of the measuring procedure in the tank 1 is picked up by the sensor 57 and fed via the electrical connection 58 as the measured variable to the central control 31. This measured variable is non-linearly proportional with the state of fill and may if necessary, after calculation of values derived from it, be reproduced on the indicator 33. A measurement of consumption can be performed by comparing measured variable from measuring procedures at different times. Preferably, the determination of reduced pressure is effected after a short time of stabilization after the conclusion of the gas removal process. After completion of the measuring procedure, switching-back of the control valve 52 onto ventilation may be performed, either by hand or automatically. The piston 37 can thereby return to its rest position and the ventilation valve 7 opened again.

Figure 4:
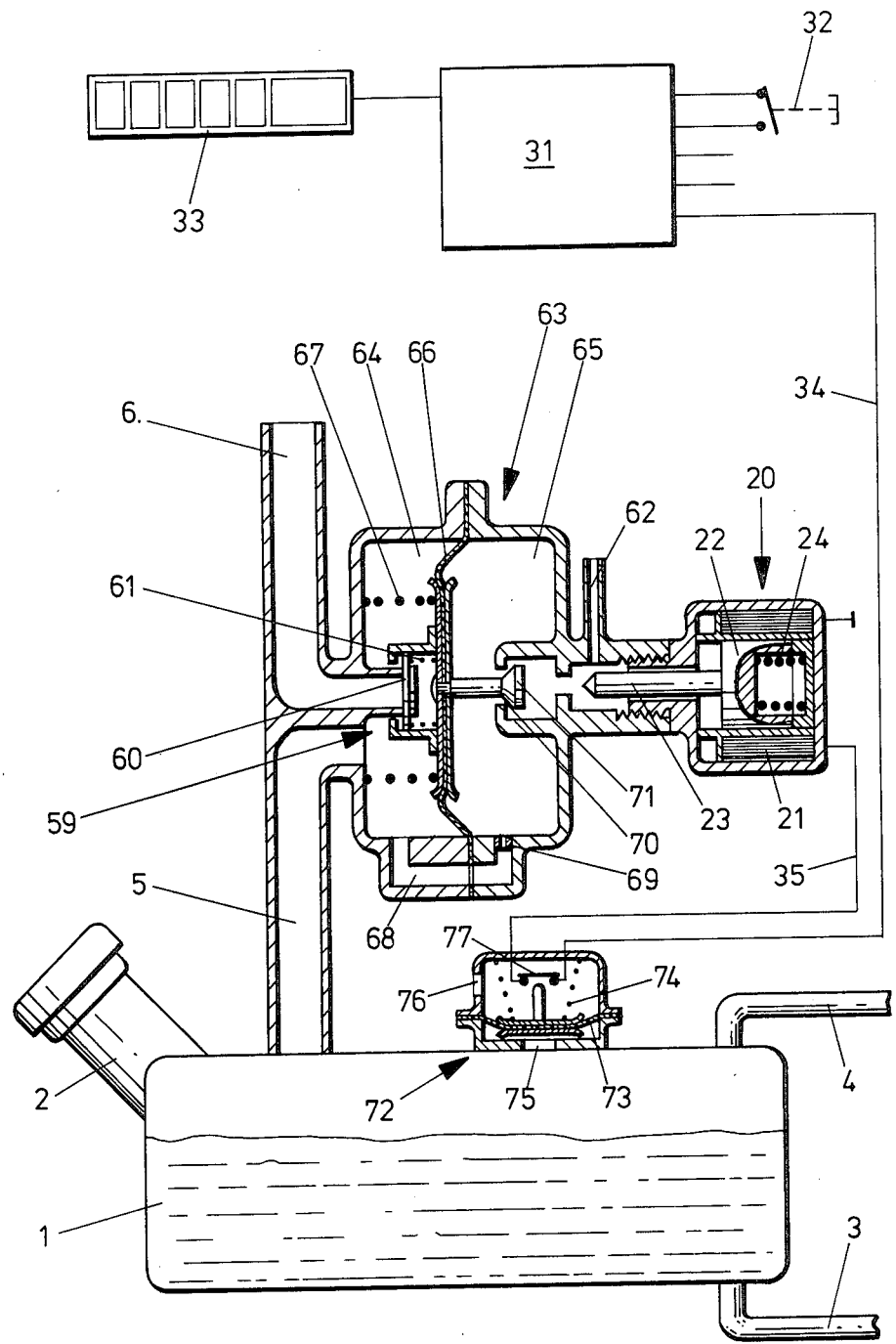
FIG. 4 is a diagrammatic view of a fourth example similar to the first example.

In the example shown in FIG. 4, parts coresponding with the FIG. 1 example are designated by the same reference numbers. The embodiment as FIG. 4 differs from that in accordance with FIG. 1 essentially in that instead of a constant volumetric discharge a constant volumetric infeed per unit time is applied. A tank 1 for liquid fuel has a filler pipe 2, a feed pipe 3 leading off from the bottom of the tank and a return pipe 4 for excess fuel opening into the top of the tank. A ventilation pipe 5 leading off the top of the tank 1 is connected via a ventilation valve 59 to a ventilation stub 6 leading to the outside. Normally the ventilation valve 59 is open so that the tank space 1 is ventilated, but the ventilation valve 59 is closed during each measuring procedure. It has a closing body 60 which, under the influence of a closing spring 61, makes a seal against the face of the inner end of the ventilation stub 6. The control and method of operation of the ventilation valve 59 are explained in greater detail below.

An overpressure pipe 62 leads to a differential pressure regulator 63 having a first chamber 64 which is connected to the ventilation pipe 5 and a second chamber 65 which is separated from the first chamber 64 by a movable control diaphragm 66. In the first chamber 64 there is a compression spring 67 which biasses the control diaphragm 66 out of the first chamber 64. The first and second chambers 64, 65 are connected together by a pressure pipe 68 in which there is a constriction 69. The overpressure pipe 62 connects with a body 71 connected to the control diaphragm 66 and which closes a control opening 70. In the operational state of the differential pressure regulator 63 the opening is opened by the closing body 71 and thereby the control diaphragm 66 to a greater or less or extent.

An electromagnetically operating control valve 20 has an electrically controllable stationary magnetic coil 21 with which is associated a linearly movable valve slider 22 having a valve shank 23. At the front end of the valve shank 23 there is a valve cone which can block the connection between the overpressure pipe 62 and the control opening 70, in the unexcited state of the magnet coil 21, by means of a compression spring 24 which biasses the valve slider 22 in the closing direction. In the excited state of the coil 21 the control valve 20 is opened against the action of the compression spring 24.

A manometer 72, in the form of an overpressure switch, has a diaphragm 72 which separates two chambers from one another. Whilst one of the chambers is connected via an opening 75 to the tank 1 there is a compression spring 74 in the other chamber, which acts upon the diaphragm 73. Furthermore, the other chamber has a vent 76 and a switch 77 controlled by movement of the diaphragm 73. A central control 31 in the form, for example, of a microprocessor is connected to a key 32 and to a multiple, for example, digital indicator 33 serving for the display of the state of fill or of the consumption. An electrical connection 34 leads from the central control 31 to one contact of the switch 77, the other contact of which is connected by an electrical control, and a connection 35 to the coil 21 which is earthed at its opposite side.

Operation is as follows:

At rest the control valve 20 is blocked as in the case of the FIG. 1 example. In that case the compression spring 67 displaces the control diaphragm 66 in a direction to enlarge the first chamber 64. In doing this a hat-shaped holder which embraces the closing body 60 and is connected to the control diaphragm 66 pulls the closing body 60 away from the end face of the ventilation stub 6 so that the tank 1 can be ventilated. In this state the switch 77 of the manometer 72, acting as an overpressure switch, is closed. Upon actuation of the key 32, or because of an automatically repeating measuring cycle, the central control 31 generates a control signal which via the electrical connections 34, 35 and the switch 77 opens the control valve 20. The device is thereby set in operation and a constant volumetric flow of gas per unit time may be fed to the tank space 1 until the overpressure switch responds.

Upon opening the control valve 20 the overpressure comes from the overpressure pipe 62 second chamber 65 via the control opening 70 whereby the control diaphragm 66 is moved against the action of the compression spring 67. The closing-body 60 is thereby pressed by closing spring 61 against the endface of the inner end of the ventilation stub 6, to close the ventilation valve 59. When the control diaphragm 66 moves under the influence of the overpressure and the closing body 71 thereupon approaches the control opening 70, there follows a throttling of the gas being fed in, in such a way that the force from the differential pressure against the control diaphragm 66 is exactly in equilibrium with the force from the compression spring 67. Hence there follows a largely pulsation-free regulation of the differential pressure between the first and second chambers 64, 65. As in the case of the embodiment of FIG. 1 there should also exist a high ratio between the areas of the working face of the control diaphragm 66 and the control opening 70. The actual working range of the control diaphragm 66 in the regulating state likwise amounts to only some hundredths of a millimeter.

Since a constant differential pressure prescribed by the differential pressure regulator 63 is applied to the pressure pipe 68 and the constriction 69, a constant volume of gas flow per unit time is fed via the construction 69. The pressure thereby rises in the tank space 1 and this process continues until the manometer 72 responds at an appropriate level of overpressure and opens its switch 77. At this instant the excitation of the magnet coil 21 is interrupted, so that the control valve 20 closes and the feed-in process is interrupted. As in the case of the example of FIG. 1 there is a timer (not shown) in the central control 31 which picks up the time of energizing or of opening respectively of the control valve 20 as the measured variable. This is directly proportional to the volume of gas in the tank space 1 and indirectly proportional to the state of fill or respectively to the residual amount of fuel if the volume of the first chamber 64 and the ventilation pipe 5 may be neglected as compared with the volume of gas in the tank space 1. After completion of the measuring procedure the compression spring 67 sees to it that the control diaphragm 66 opens the ventilation valve 59 by withdrawing the closing-body 60 from the inner end of the ventilation stub 6 until another measuring procedure is initiated. Also, in this case, by comparing the measured values at two measuring procedures effected at different times a measured variable may be derived which corresponds with the fuel consumption during the interval.

As compared with the FIG. 1 example, that of FIG. 4 has the advantage that only air enters via the constriction 69 and hence practically no time errors can occur. In the case of the FIG. 1 example on the contrary one cannot completely exclude the possibility that in suction via the constriction 18, because of a different gas composition small errors in time may occur, as a result of the differences in the physical values of the fuel vapour and air, such as density and kinematic viscosity.

I claim:

1. A method of measuring the amount of liquid fuel in a ventilated fuel tank, said method comprising the steps of stopping temporarily the ventilation from the tank; removing from said unventilated tank an amount of gas; and measuring a quantity indicative of the change in the state of said gas in said tank to provide an indirect measurement of the amount of fuel in said tank, said gas is removed from said tank at a constant volumetric flow rate and said quantity measured comprises the time taken for a predetermined alteration in pressure of said gas in said tank to occur.

2. A method of measuring the amount of liquid fuel in a ventilated fuel tank, said method comprising the steps of stopping temporarily the ventilation from the tank; feeding into said unventilated tank an amount of gas; and measuring a quantity indicative of the change in the state of said gas in said tank to provide an indirect measurement of the amount of fuel in said tank, said gas is fed into said tank at a constant volumetric flow rate and said quantity measured comprises the time taken for a predetermined alteration in pressure of said gas in said tank to occur.

3. A device for measuring the amount of liquid fuel in a fuel tank having a ventilation pipe, said device comprising a ventilation valve located in said ventilation pipe; means for normally maintaining said valve in an open position and for moving said valve to a closed position in use, said means being arranged to be connected to said tank for the removal of gas from said tank; said device including a sensor adapted to measure a quantity indicative of the change in the state of said gas in said tank to provide an indirect measurement of the amount of fuel in said tank, a reduced pressure pipe and wherein said means includes a differential pressure regulator located between the tank and said reduced pressure pipe, the device having a pipe connecting the input and output of said regulator and being provided with a constriction, said sensor including a manometer for sensing a predetermined reduced pressure in said tank; and a central control, said control having a timer for measuring the time elapsed until said predetermined reduced pressure is reached, to provide an indication of the amount of fuel in said tank.

4. A device according to claim 3, in which said manometer has an electrical switch which is normally closed and is opened when said predetermined reduced pressure is reached, the said means including an electromagnetic control valve for connection in use to the reduced pressure pipe, and electrical control connections being provided between said central control and said switch and between said switch and said control valve.

5. A device according to claims 3 or 4, wherein the differential pressure regulator has a movable control diaphragm; a first chamber connected in use to said tank; a second chamber, said diaphragm separating said first and second chamber, and one of said chambers having a compression spring therein in engagement with said diaphragm; and a control port opening into the second chamber in the working area of said control diaphragm from said reduced pressure pipe.

6. A device according to claim 5, wherein said control diaphragm engages with said ventilation valve, said valve being spring biassed to a closed position during said measuring procedure.

7. A device for measuring the amount of liquid fuel in a fuel tank having a ventilation pipe, said device comprising a ventilation valve located in said ventilation pipe; means for normally maintaining said valve in an open position and for moving said valve to a closed position in use, said means being arranged to be connected to said tank for the removal of gas from said tank; said device including a sensor adapted to measure a quantity indicative of the change in the state of said gas in said tank to provide an indirect measurement of the amount of fuel in said tank, said means comprises a cylinder, said cylinder having a piston movable by reduced pressure out of a defined rest position, said cylinder and piston defining a first chamber connected to said tank and a second chamber, a control valve connecting said second chamber during said measuring procedure to a reduced pressure pipe and otherwise ventilating said second chamber, said device including a pushrod, said pushrod opening said ventilating valve, said valve being biassed to a closed position by a closing spring and said pushrod extending into said first chamber for actuation by said piston in said rest position of said piston.

8. A device according to claim 7, further including a reduced pressure regulator located between said control valve and said second chamber; a sensor for measuring the length of stroke of said piston between its rest position and an equilibrium position to provide a measured quantity indicative of the amount of fuel in said tank.

9. A device according to claim 7, wherein said piston is arranged to stroke over a given distance, said device including a sensor measuring the reduction of pressure in said tank to provide an indirect measure of the amount of fuel in said tank.

10. A device according to claim 7, 8 or 9, in which said piston is pot-shaped, thus having an open end, said open end opening to said second chamber, and said piston having a sealing membrane connecting it to said cylinder.

11. A device according to claim 7, 8 or 9, in which said cylinder and piston have axes arranged substantially vertically.

12. A device according to claim 7, 8 or 9, which includes a compression spring located in said second chamber for biassing said piston into said rest position.

13. A device according to claim 7, 8 or 9, wherein said piston has a pin, a guide said cylinder having a guide, and said pin engaging in said guide.

14. A device according to claim 13, which includes an electrical measuring coil associated with said guide for measuring the position of said piston relative to said cylinder.

15. A device according to claim 14, including a central control and a display, said control being connected to said sensor, said control valve and said display.

16. A device according to claim 15, wherein said central control is a microprocessor.

17. A device for measuring the amount of liquid fuel in a fuel tank having a ventilation pipe, said device comprising a ventilation valve located in said ventilation pipe; means for normally maintaining said valve in an open position and for moving said valve to a closed position in use, said means being arranged to be connected to said tank for the feeding of gas into said tank; said device including a sensor adapted to measure a quantity indicative of the change in the state of said gas in said tank to provide an indirect measurement of the amount of fuel in said tank, an overpressure pipe and wherein said means includes a differential pressure regulator located between the tank and said overpressure pipe, the device having a pipe connecting the input and output of said regulator and being provided with a constriction, said sensor including a manometer for sensing a predetermined increased pressure in said tank; and a central control, said control having a timer for measuring the time elapsed until said predetermined increased pressure is reached, to provide an indication of the amount of fuel in said tank.

18. A device according to claim 17, in which said manometer has an electrical switch which si normally closed and is opened when said predetermined increased pressure is reached, the said means including an electromagnetic control valve for connection in use to the overpressure pipe, and electrical control connections being provided between said central control and said switch and between said switch and said control valve.

19. A device according to claim 17 or 18, wherein the differential pressure regulator has a movable control diaphragm; a first chamber connected in use to said tank; a second chamber, said diaphragm separating said first and second chambers, and one of said chambers having a compression spring therein in engagement with said diaphragm; and a control port opening into the second chamber in the working area of said control diaphragm from said overpressure pipe.

20. A device according to claim 19, wherein said control diaphragm engages with said ventilation valve, said valve being spring biassed to a closed position during said measuring procedure.

* * * * *